US010289102B2

(12) United States Patent
Yoshino

(10) Patent No.: US 10,289,102 B2
(45) Date of Patent: May 14, 2019

(54) ROBOT SELECTION METHOD AND ROBOT SELECTION DEVICE

(71) Applicant: HONDA MOTOR CO., LTD., Minato-Ku, Tokyo (JP)

(72) Inventor: Tetsuya Yoshino, Tochigi-Ken (JP)

(73) Assignee: Honda Motor Co., Ltd., Tokyo (JP)

( * ) Notice: Subject to any disclaimer, the term of this patent is extended or adjusted under 35 U.S.C. 154(b) by 20 days.

(21) Appl. No.: 15/547,989

(22) PCT Filed: Feb. 3, 2016

(86) PCT No.: PCT/JP2016/053134
§ 371 (c)(1),
(2) Date: Aug. 1, 2017

(87) PCT Pub. No.: WO2016/125812
PCT Pub. Date: Aug. 11, 2016

(65) Prior Publication Data
US 2018/0024539 A1    Jan. 25, 2018

(30) Foreign Application Priority Data
Feb. 5, 2015    (JP) .................. 2015-021054

(51) Int. Cl.
G05B 19/00    (2006.01)
G05B 19/418    (2006.01)
(Continued)

(52) U.S. Cl.
CPC .......... G05B 19/4187 (2013.01); B23K 11/11 (2013.01); B23K 11/24 (2013.01);
(Continued)

(58) Field of Classification Search
CPC ...... G05B 19/4187; G05B 2219/45135; B23K 11/36; B23K 11/315; B23K 11/314;
(Continued)

(56) References Cited

U.S. PATENT DOCUMENTS 5,353,238 A    10/1994  Neef et al.
5,641,415 A    6/1997   Kosaka et al.
(Continued)

FOREIGN PATENT DOCUMENTS

JP    10-187223 A    7/1998
JP    2012-091304 A  5/2012
JP    5474739 B2     4/2014

OTHER PUBLICATIONS

PCT/ISA/210 from PCT/2016/053134 with the English translation thereof.
(Continued)

Primary Examiner — Christopher E. Everett
(74) Attorney, Agent, or Firm — Carrier Blackman & Associates, P.C.; William D. Blackman; Joseph P. Carrier

(57) ABSTRACT

After selecting a robot for carrying out a welding operation at a given welding spot, the cross-section of a welding gun with which that robot is provided and the cross-section of a workpiece at the welding spot are compared. Furthermore, a determination is made as to whether or not welding is possible without the welding gun and the workpiece coming into contact. When it is determined to be impossible, a substitute robot for carrying out the welding of the welding spot is selected. With the present invention, the automatic selection of the robot for carrying out the welding operation for the welding spot becomes possible. Therefore, the number of steps for robot selection can be reduced.

6 Claims, 8 Drawing Sheets

(51) Int. Cl.
*B23K 11/11* (2006.01)
*B23K 11/24* (2006.01)
*B23K 11/25* (2006.01)
*B23K 11/31* (2006.01)
*B23K 11/34* (2006.01)
*B23K 11/36* (2006.01)

(52) U.S. Cl.
CPC .......... *B23K 11/252* (2013.01); *B23K 11/314* (2013.01); *B23K 11/315* (2013.01); *B23K 11/34* (2013.01); *B23K 11/36* (2013.01); *G05B 2219/45135* (2013.01); *Y10S 901/42* (2013.01)

(58) Field of Classification Search
CPC ....... B23K 11/252; B23K 11/34; B23K 11/11; B23K 11/24; Y10S 901/42
See application file for complete search history.

(56) References Cited

U.S. PATENT DOCUMENTS

2010/0023150 A1* 1/2010 Cai .................... B23K 11/11
                                                                    700/103
2010/0198384 A1* 8/2010 Gupta ................ B23K 11/314
                                                                    700/103
2015/0375325 A1* 12/2015 Flewelling ........... B23K 9/0956
                                                                    219/124.1

OTHER PUBLICATIONS

Office Action dated Jun. 26, 2018 issued over the corresponding Canadian Patent Application No. 2,975,728.

* cited by examiner

FIG. 4

| OPERATION PROCESS / SPOT NUMBER | A | B | C | D | ... |
|---|---|---|---|---|---|
| 1001 | ○ | ○ | | | |
| 1002 | | ○ | | ○ | |
| 1003 | | | ○ | ○ | |
| 1004 | | | | ○ | |
| 1005 | | | | | |
| ⋮ | | | | | |

ROBOT SELECTION METHOD AND ROBOT SELECTION DEVICE

TECHNICAL FIELD

The present invention relates to a robot selection method and a robot selection apparatus (device) for selecting a robot to perform welding of a welding spot.

BACKGROUND ART

For example, Japanese Laid-Open Patent Publication No. 2012-091304 and Japanese Patent No. 5474739 disclose techniques relating to off-line teaching of a welding gun performing a welding operation. In the technique described in Japanese Patent Laid-Open No. 2012-091304, teaching data for existing workpieces is diverted as teaching data for similar new workpieces. In the technique described in Japanese Patent No. 5474739, interference between two robots is detected.

SUMMARY OF INVENTION

A technique for automatically selecting a robot to perform a welding operation with respect to a welding spot is not disclosed, including Japanese Laid-Open Patent Publication No. 2012-091304 and Japanese Patent No. 5474739. In the present situation, for each welding spot, the operator performs the verification/selection operation of the robot that performs the welding operation on the welding spot. Excessive worker-hours are required for such an operation.

The present invention has been made in consideration of such problems, and it is an object of the present invention to provide a robot selection method and a robot selection apparatus capable of automatically selecting a robot to perform a welding operation with respect to welding spots and reducing a worker-hour for selecting a robot.

A method according to the present invention is a robot selection method for selecting a robot for each of a plurality of welding spots distributed in a workpiece to perform a welding operation with respect to the welding spots, the robot selecting method comprising: a robot selection step of selecting the robot to perform the welding operation on any of the welding spots; a welding capability determination step of determining whether it is possible to weld the welding spot without contact between a welding gun of the robot selected in the robot selection step and the workpiece by comparing a cross section of the welding gun and a cross section of the workpiece; and a substitution robot selection step of selecting a substitution robot that substitutes for welding at the welding spot in a case where the robot selected is determined to be incapable in the welding capability determination step.

In the present invention, after selecting a robot to perform a welding operation at an arbitrary welding spot, the cross section of the welding gun of the robot is compared with the cross section of the workpiece at the welding spot. Then, it is determined whether welding can be performed without contact between the welding gun and the workpiece. If it is determined that it is not possible, a substitution robot that substitutes welding at the welding spot is selected. According to the present invention, by performing such a process, it is possible to select automatically a robot that performs a welding operation on a welding spot. As a result, it is possible to reduce worker-hours for robot selection.

Further, in the present invention, in the substitution robot selection step, a candidate for the substitution robot is selected, a cross section of a welding gun of the candidate for the substitution robot and a cross section of the workpiece at the welding spot are compared, and the candidate for the substitution robot is selected as the substitution robot in a case where the welding spot can be welded using the welding gun of the candidate for the substitution robot without contact between the welding gun and the workpiece. In this way, by determining whether the substitution robot can be a fill-in, it is possible to select automatically a robot that performs a welding operation on the welding spot.

In the present invention, in the substitution robot selection step, the substitution robot may be selected from the working station where the robot is installed. In this way, it is easy to select the substitution robot.

In the present invention, in the substitution robot selection step, the substitution robot may be selected from a working station different from the working station where the robot is installed. In this way, the number of options of the substitution robot is increased, and the possibility of finding the substitution robot is increased.

An apparatus according to the present invention is a robot selecting apparatus for selecting a robot for each of a plurality of welding spots distributed in a workpiece to perform a welding operation with respect to the welding spots, the apparatus comprising: a robot selecting unit configured to select the robot to perform the welding operation on any of the welding spots; a welding capability determination unit configured to determine whether it is possible to weld the welding spot without contact between a welding gun of the robot selected by the robot selecting unit and the workpiece, by comparing a cross section of the welding gun with a cross section of the workpiece at the welding spot; and a substitution robot selecting unit configured to select a substitution robot that substitutes for welding at the welding spot in a case where the robot selected is determined to be incapable by the welding capability determination unit.

In the present invention, the substitution robot selection unit is configured to select a candidate for the substitution robot, compare a cross section of a welding gun of the candidate for the substitution robot with the cross section of the workpiece at the welding spot, and select the candidate as the substitution robot in a case where the welding spot can be welded using the welding gun of the substitution robot without contact between the welding gun and the workpiece.

According to the present invention, it is possible to select automatically a robot that performs a welding operation with respect to a welding spot. Therefore, it is possible to reduce the worker-hour for robot selection.

BRIEF DESCRIPTION OF DRAWINGS

FIG. 4 is a view showing an example of a welding spot-process table;

DESCRIPTION OF EMBODIMENTS

Preferred embodiments of a robot selection method and a robot selection apparatus according to the present invention will be described in detail below with reference to the accompanying drawings. In the present embodiment, a vehicle body is assumed as the workpiece W, but the present invention is also applicable to a workpiece other than the vehicle body.

[Description of Production Line]

Figure 1:
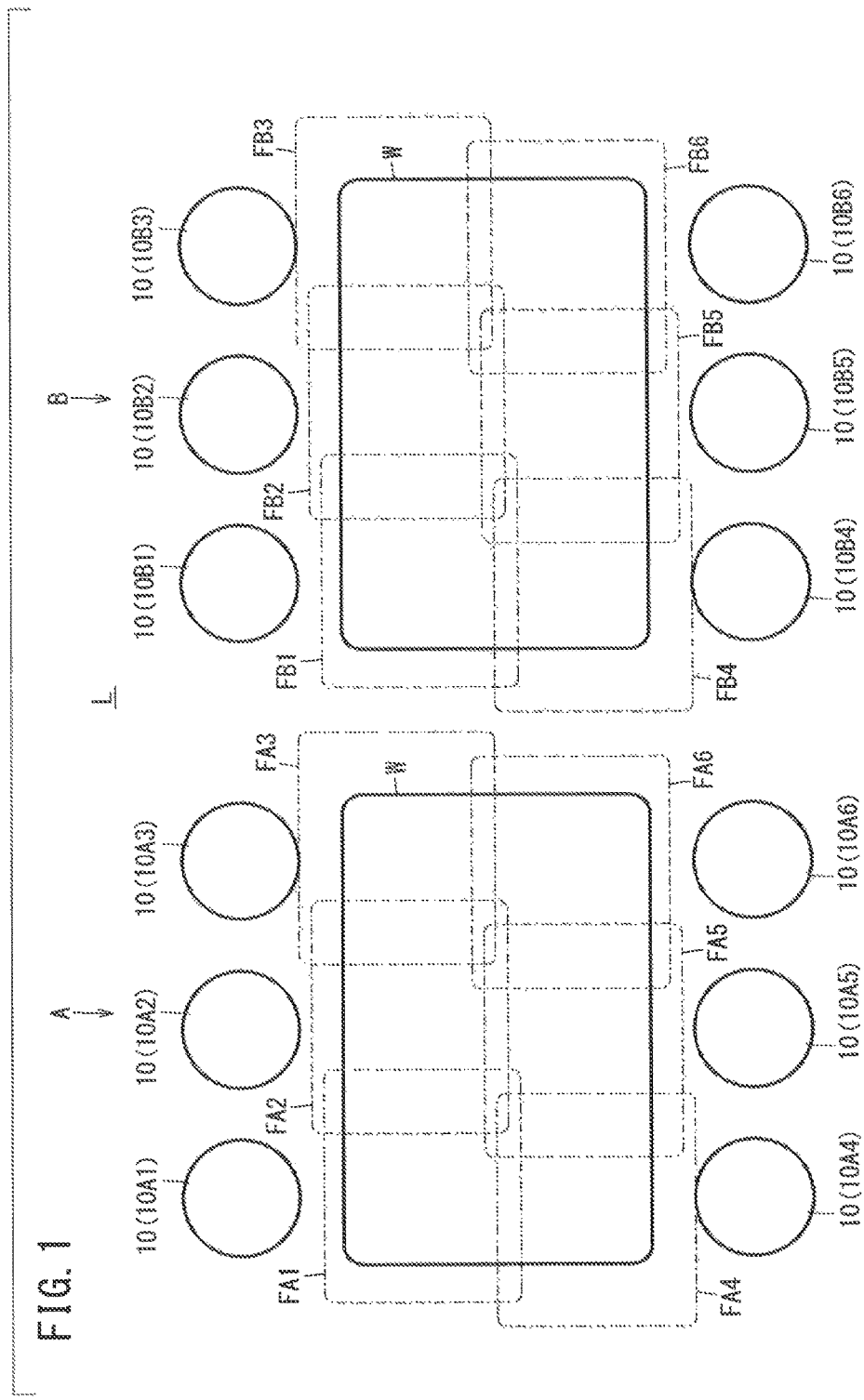
FIG. 1 is a plan view of a production line with two working stations.

Before describing a robot selection apparatus 40 according to the present invention, the production line L on which the welding operation of the workpiece W is performed will be described with reference to FIG. 1. FIG. 1 shows a production line L with two working stations A, B. Each of the working stations A and B is provided for each operation step for the workpiece W. For convenience of explanation, the production line L having only two working stations A and B will be described, but the number of working stations provided in the production line L corresponds to the number of operation steps. In the production line L shown in FIG. 1, six robots 10 (10A1 to 10A6) are installed in the working station A and six robots 10 (10B1 to 10B6) are installed in the working station B.

Figure 2:
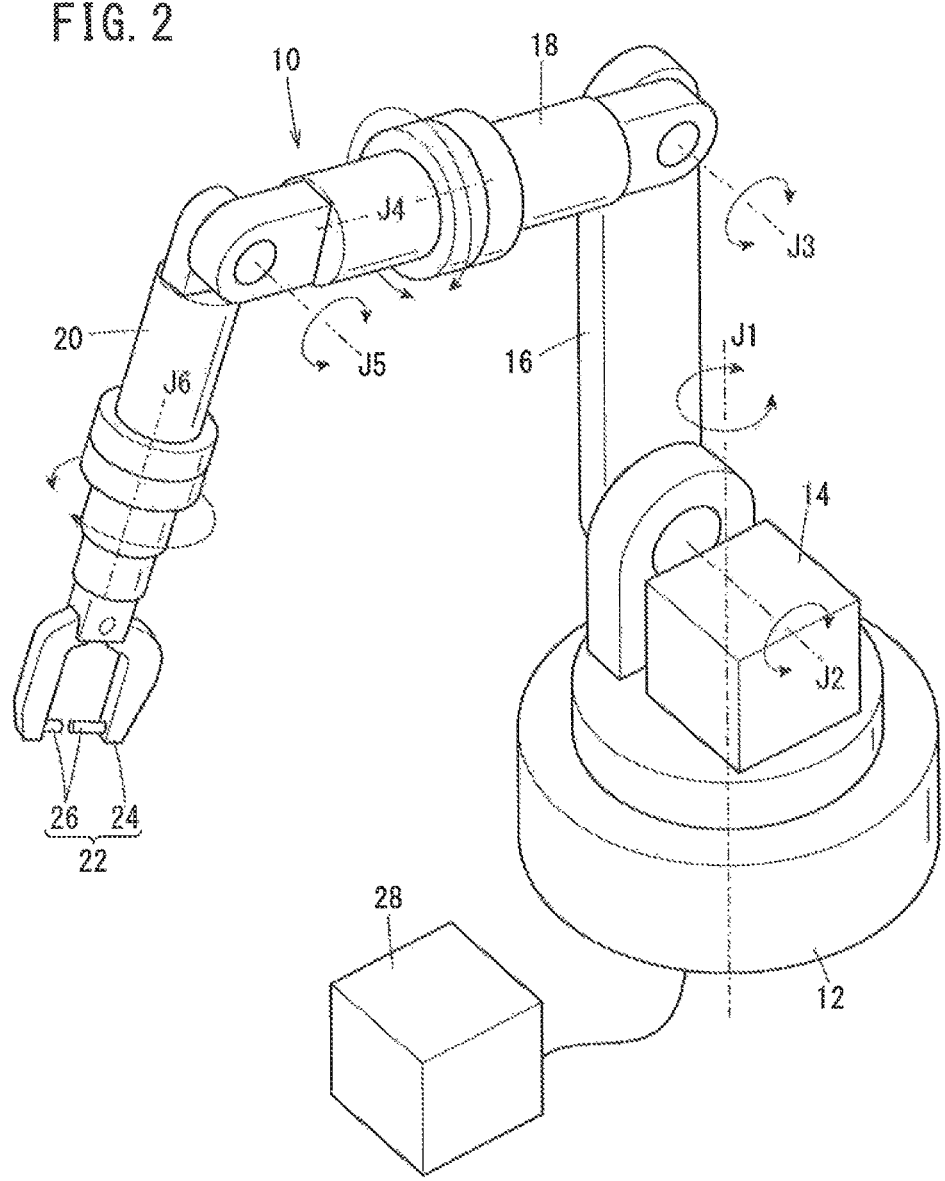
FIG. 2 is an external view of the robot.

Here, with reference to FIG. 2, each robot 10 used in this embodiment will be described. The robot 10 is a multi-axis robot, and includes an installation section 12 and a turning section 14, a first arm 16, a second arm 18, and a third arm 20 in this order with reference to the installation section 12. The installation section 12 is installed at the predetermined installation sites in each working station A, B shown in FIG. 1. The turning section 14 is rotatably connected to the installation section 12 by a shaft J1. The first arm 16 is rotatably connected to the turning section 14 by a shaft J2. The second arm 18 is rotatably connected to the first arm 16 by a shaft J3. The second arm 18 can be twisted and rotated by the shaft J4. The third arm 20 is rotatably connected to the second arm 18 by a shaft J5. The third arm 20 can be twisted and rotated by the shaft J6. A welding gun 22 is detachably provided at a distal end of the third arm 20. The welding gun 22 includes a gun arm 24 that can be opened and closed and electrode tips 26. The controller 28 controls the operation of the robot 10 based on teaching data set in advance to process the workpiece.

In this specification, all robots 10 installed in the working stations A and B are described as being the same, but robots installed in the working stations A and B may be different from each other.

Returning to FIG. 1, the explanation will be continued. The workpiece W is conveyed to the working station A. The robots 10A1 to 10A6 installed to the working station A weld a part of welding spots in the workpiece W. Thereafter, the workpiece W is conveyed to the working station B. The robots 10B1 to 10B6 installed in the working station B weld the remaining welding spots other than the welding spots welded by the robots 10A1 to 10A6.

For example, the robot 10A1 can weld a welding spot included in the movable range FA1. However, if it is expected that the welding gun 22 and the workpiece W are in contact with each other when attempting to weld the welding spot with the welding gun 22, the robot 10A1 cannot perform a welding operation on the welding spot. According to the present invention, as will be described later, the substitution robots 10A2 to 10A6 and 10B1 to 10B6 perform the welding operation on such welding spots.

Like the robot 10A1, the robots 10A2 to 10A6 can weld welding spots included in the movable ranges FA2 to FA6. The robots 10B1 to 10B6 can weld welding spots included in the movable ranges FB1 to FB6. In the present invention, when the first robot 10 cannot perform a welding operation with respect to the welding spot initially allocated, the second robot 10, that is, the substitution robot 10 performs welding operation on the welding spot. The determination as to whether the welding operation with respect to the welding spot initially allocated can be performed and the selection of the second robot 10 are performed by the robot selecting apparatus 40 shown in FIG. 3.

[Configuration of Robot Selection Apparatus 40]

Figure 3:
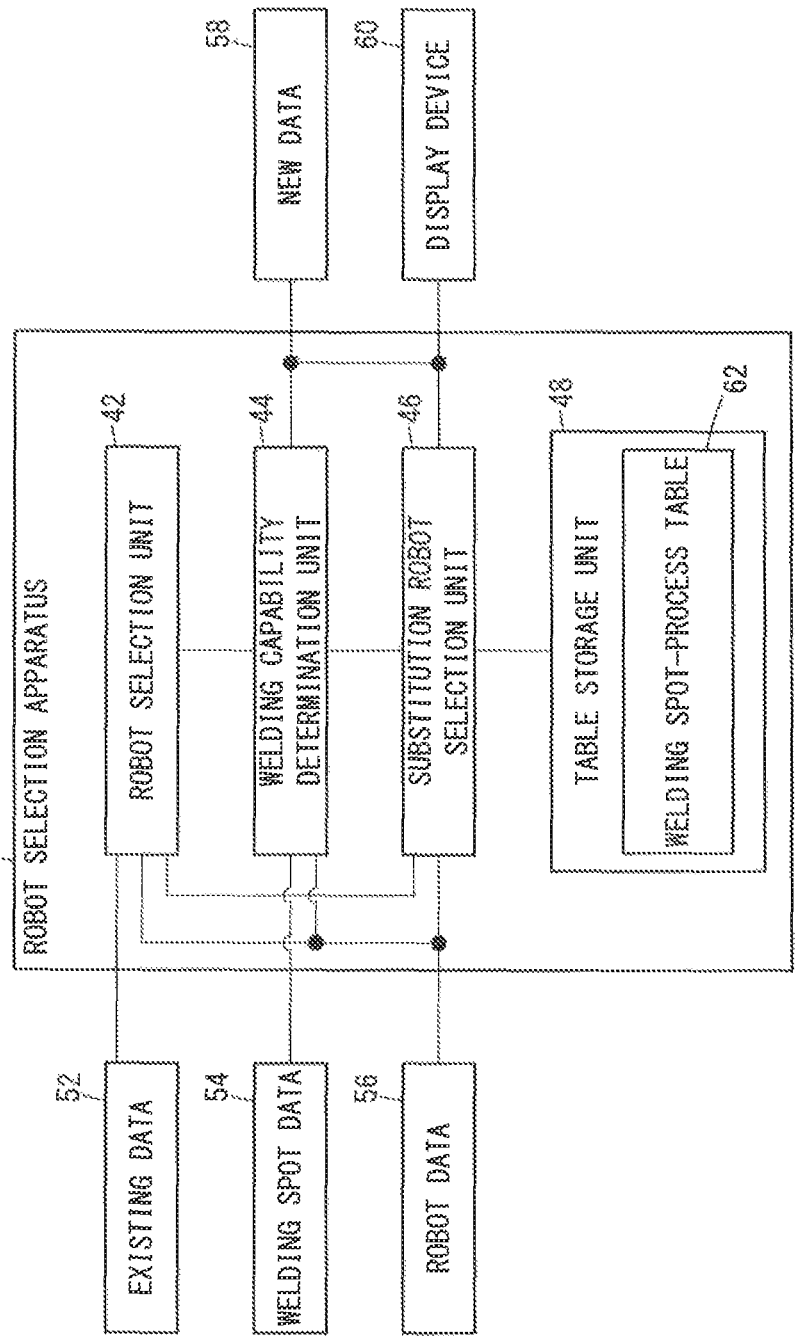
FIG. 3 is a functional block diagram of a robot selecting apparatus according to the embodiment.

The configuration of the robot selection apparatus 40 according to the present embodiment will be described with reference to FIG. 3. The robot selection apparatus 40 selects in advance which welding spot distributed in the workpiece W shown in FIG. 1 is to be welded by which robot 10 (10A1 to 10A6, 10B1 to 10B6) prior to the welding operation.

The robot selecting apparatus 40 includes a CPU that performs calculation processing, a memory that stores various data, an input/output device that inputs and outputs data, and the like, and is configured by, for example, a personal computer. The robot selection apparatus 40 functions as a robot selection unit 42, a welding capability determination unit 44, and a substitution robot selection unit 46 by executing a program stored inside or outside the apparatus. The functions of the robot selection unit 42, the welding capability determination unit 44, and the substitution robot selection unit 46 will be described later.

The robot selecting apparatus 40 acquires existing data 52, welding spot data 54, and robot data 56. The existing data 52 is data on an existing workpiece W' (for example, an existing vehicle body) different from the workpiece W (for example, a new vehicle body). The existing data 52 is formed by associating the welding spot data 54 of the workpiece W' with the robot 10. The welding spot data 54 is data of each of the welding spots distributed in the workpiece W. The welding spot data 54 is formed by data, such as the spot number, welding operation process to be performed on the spot, the coordinates, the direction perpendicular to the plane of the spot (normal direction), the cross-sectional shape of the workpiece W at the welding spot, associated with each other. The robot data 56 is data of each robot 10 installed in the working stations A and B. The robot data 56 is constructed by data, such as a working station number to which the robot is to be installed, a movable range, a cross-sectional shape of the welding gun 22 of the robot 10, and the like, associated with each other.

In addition, the robot selection apparatus 40 includes a table storage unit 48. The table storage unit 48 stores a welding spot-process table 62. FIG. 4 shows an example of the welding spot-process table 62. In the welding spot-process table 62, the spot number of each welding spot is associated with the operation process in which the welding operation of the welding spot can be performed. Specifically, in the welding spot-process table 62 shown in FIG. 4, the welding spots of the spot numbers 1001, 1002, 1003, 1004, 1005, . . . are associated with the operation processes A, B, C, D, . . . . Operation processes A and B here correspond to working stations A and B shown in FIG. 1. For example, the welding spot of spot number 1001 is associated with the operation process A and the operation process B. This indicates that the welding spot of spot number 1001 distributed in the workpiece W can be welded in the operation process A and the operation process B.

A display device 60 displays the result of the robot selection process performed by the robot selection apparatus 40 on the screen.

[Robot Selection Method]

Figure 5:
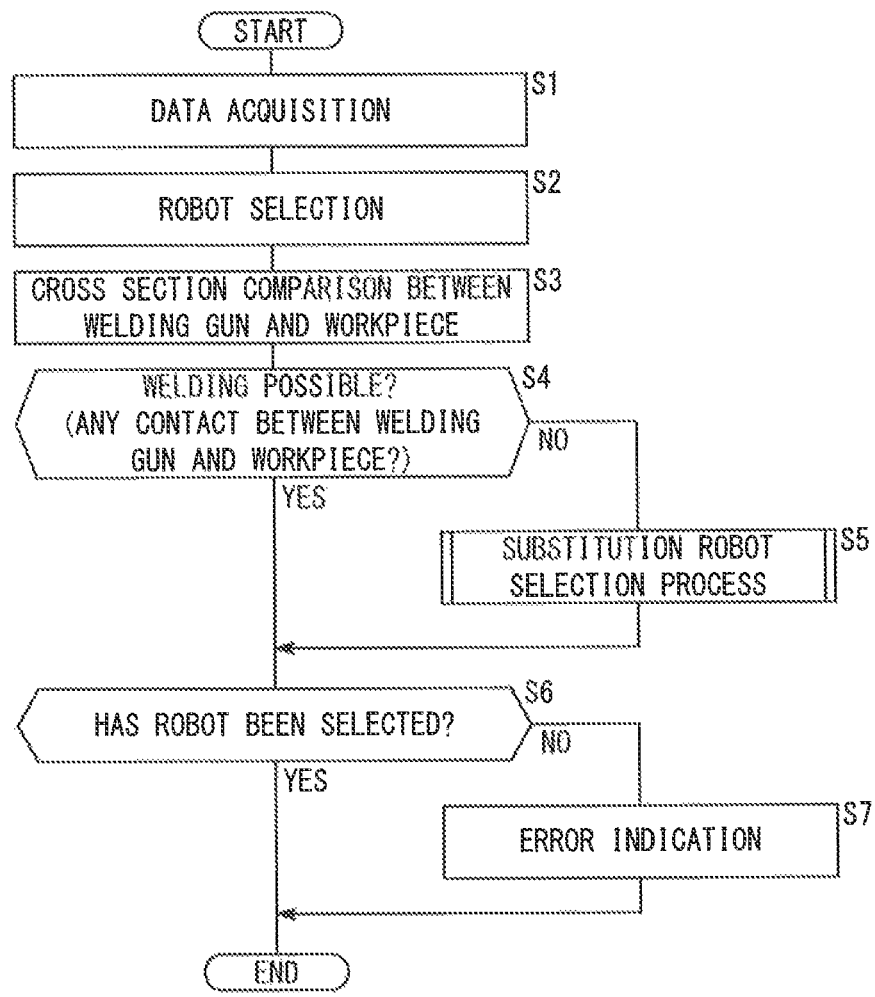
FIG. 5 is a flowchart of a robot selection method according to the embodiment.

Next, the robot selection method according to this embodiment will be described with reference to FIG. 5. The following processing is performed for each welding spot.

In step S1, the robot selecting apparatus 40 acquires the existing data 52, the welding spot data 54, and the robot data 56. In step S2, the robot selection unit 42 selects the robot 10 (10A1 to 10A6, 10B1 to 10B6) that performs a welding operation with respect to an arbitrary welding spot. For example, when the coordinate of a certain welding spot included in the welding spot data 54 is similar to the coordinate of the welding spot included in the existing data 52, the robot 10 included in the existing data 52 is selected. Alternatively, the coordinate and operation process of the welding spot included in the welding spot data 54 are collated with the working station number and the movable range of the robot 10 included in the robot data 56, and the robot 10 that can perform the welding operation on the welding spot is selected.

In step S3, the welding capability determination unit 44 compares the cross section 22C of the welding gun 22 of the robot 10 selected by the robot selection unit 42 with the cross section WC of the workpiece W at the welding spot. The cross section 22C of the welding gun 22 is acquired from the robot data 56. The cross section WC of the workpiece W at the welding spot is acquired from the welding spot data 54.

Here, the cross section 22C of the welding gun 22 will be described with reference to FIG. 6. The gun arm 24 of the welding gun 22 used in this embodiment has a first arm 24a and a second arm 24b which are openable and closable. The cross section 22C of the welding gun 22 is defined based on the state in which the first arm 24a and the second arm 24b are closed. First, a rectangular outer frame OF surrounding the entire welding gun 22 is defined. At this time, the range on the tip end side of the gun arm 24 may extend up to the plane perpendicular axis, that is, the center axis of the electrode tips 26. Next, the inner frame IF of the welding gun 22 is defined. The inner peripheral surface of the first arm 24a and the inner peripheral surface of the second arm 24b are parallel to each other. The length of a portion of the inner peripheral surface of the first arm 24a parallel to the inner peripheral surface of the second arm 24b is defined as B1 and the length from the inner peripheral surface of the first arm 24a to the central axis C of the gun arm 24 is defined as H1. Similarly, the length of a portion of the inner peripheral surface of the second arm 24b parallel to the inner peripheral surface of the first arm 24a is defined as B2, and the length from the inner peripheral surface of the second arm 24b to the central axis C of the welding gun 22 is defined as H2. A rectangular frame surrounded by the length B1 and the length H1 and a rectangular frame surrounded by the length B2 and the length H2 are defined as the inner frame IF of the welding gun 22. A portion of the welding gun 22 surrounded by the outer frame OF excluding a portion surrounded by the inner frame IF is defined as a cross section 22C of the welding gun 22. It is also possible to define the cross section 22C by another method.

Figure 7A:
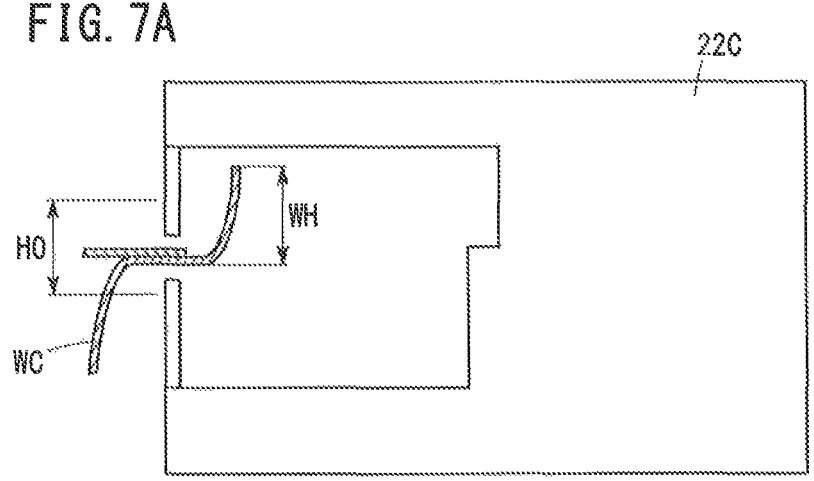
FIG. 7A is a view showing a state in which a gun arm and the workpiece are not in contact.
Figure 7B:
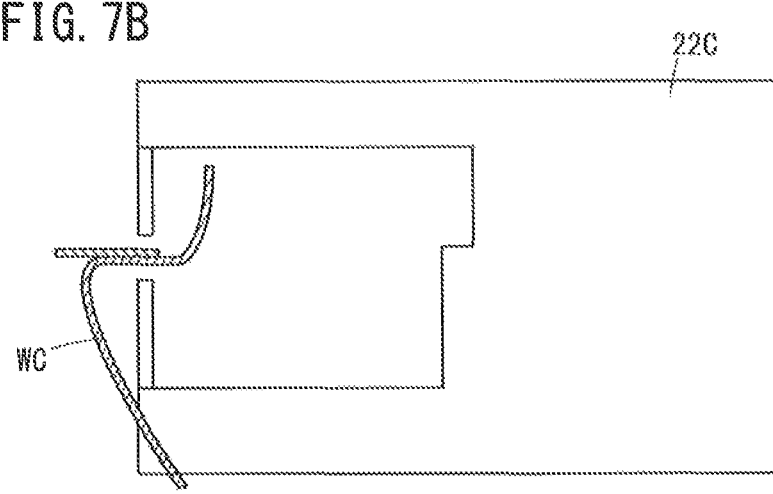
FIG. 7B is a view showing a state in which the gun arm and the workpiece are in contact.

In step S4, the welding capability determination unit 44 determines whether it is possible to weld the welding spot with the welding gun 22 of the robot 10. Specifically, the following simulation is performed. The welding capability determination unit 44 assumes a state in which the posture of the welding gun 22 is adjusted based on the coordinates included in the welding spot data 54 and the direction perpendicular to the plane of the spot, and compares the cross section 22C of the welding gun 22 and the cross section WC of the workpiece W with each other. As shown in FIG. 7A, when the cross section 22C of the welding gun 22 and the cross section WC of the workpiece W do not contact each other, the welding capability determination unit 44 determines that welding is possible (step S4: YES). At this time, the process proceeds to step S6. On the other hand, as shown in FIG. 7B, when the cross section 22C of the welding gun 22 makes contact with the cross section WC of the workpiece W, the welding capability determination unit 44 determines that welding is impossible (step S4: NO). At this time, the process proceeds to step S5, and the substitution robot selection process is performed.

Figure 6:
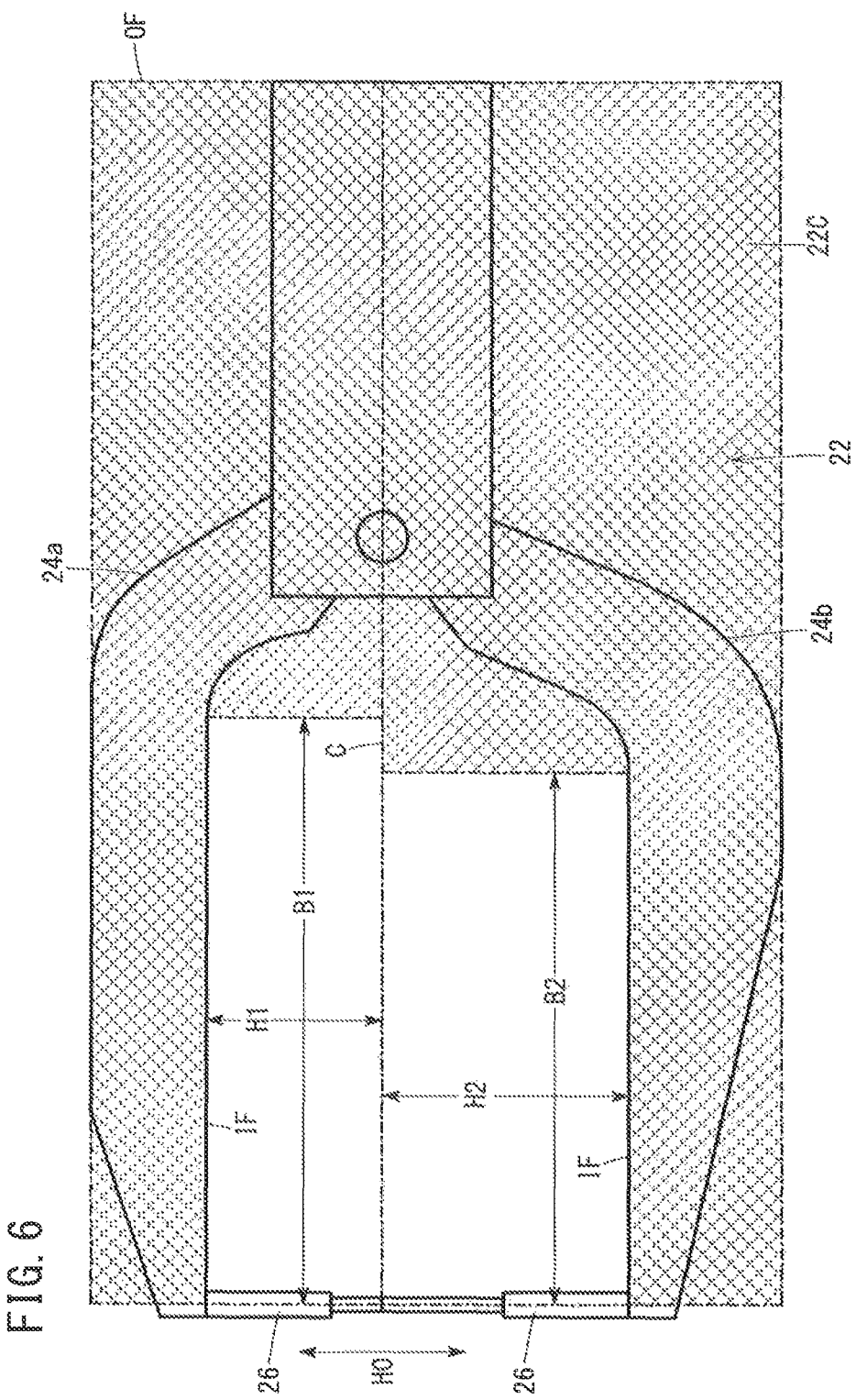
FIG. 6 is a view for explaining a cross section of a welding gun.

As shown in FIG. 6, when the first arm 24a and the second arm 24b are opened, the electrode tips 26, 26 are opened only by H0. In step S4, the welding capability determination unit 44 also determines whether the workpiece W to be placed between the gun arms 24 passes through the gun opening/closing height H0. When the height WH of the workpiece W is smaller than the gun opening/closing height H0, the welding capability determination unit 44 determines that welding is possible (step S4: YES). On the other hand, when the height WH of the workpiece W is larger than the gun opening/closing height H0, the welding capability determination unit 44 determines that welding is impossible (step S4: NO).

In step S6, it is determined whether the robot 10 performing the welding operation with respect to the welding spot is selected. When the robot 10 that can be welded is selected by the robot selection unit 42 or the substitution robot selection unit 46 (step S6: YES), the series of processing ends. The welding capability determination unit 44 or the substitution robot selection unit 46 creates new data 58 in which the welding spot and the robot 10 performing the welding operation on the welding spot are associated. On the other hand, if the robot 10 capable of welding is not selected by the robot selection unit 42 or the substitution robot selection unit 46 (step S6: NO), the process proceeds to step S7. In step S7, the display device 60 displays an error indicating that the robot 10 has not been selected at the welding spot, and a series of processing is completed.

Figure 8:
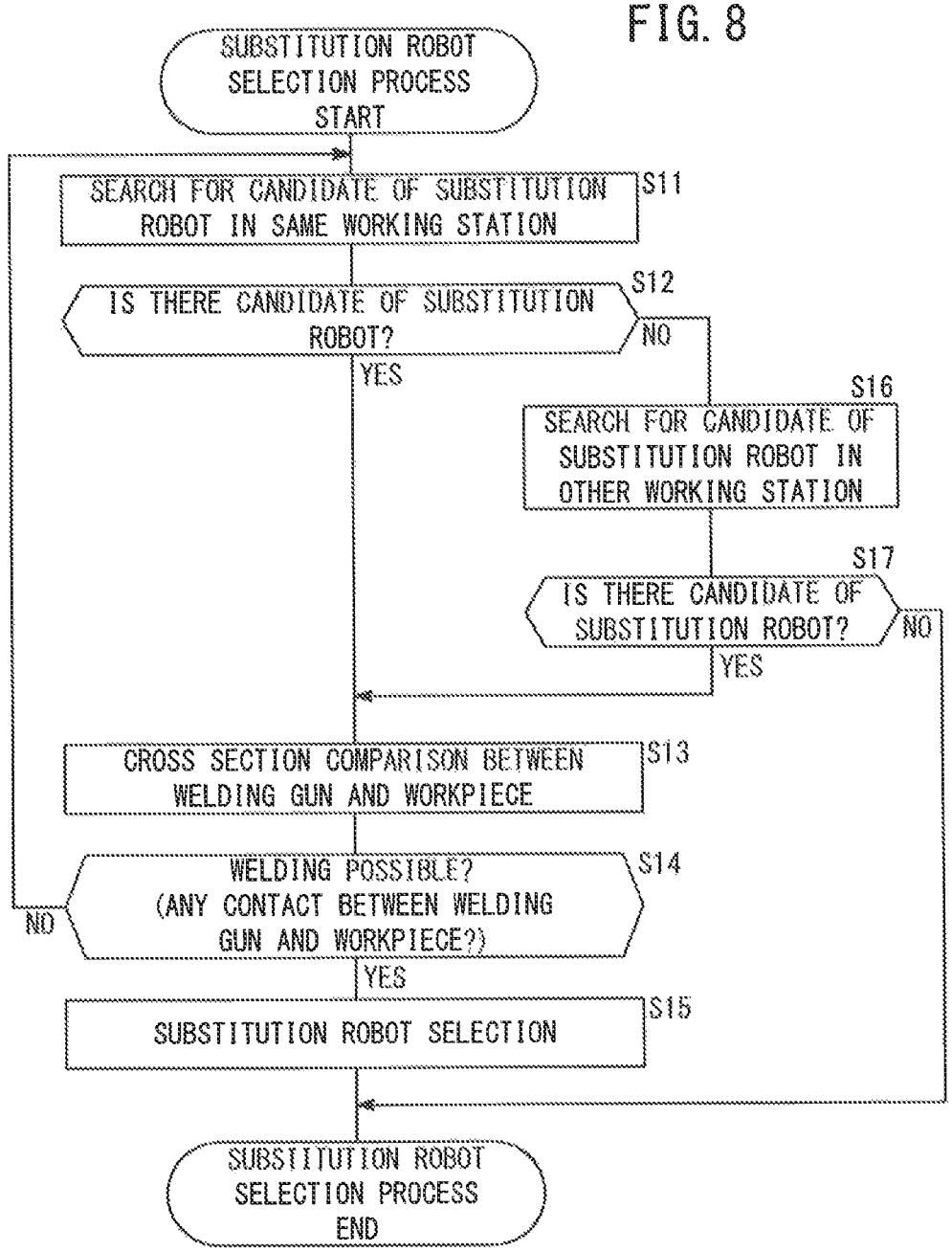
FIG. 8 is a flowchart of the substitution robot selection process.

Next, the substitution robot selection step shown in step S5 in FIG. 5 will be described with reference to FIG. 8. The substitution robot selection process is performed mainly by the substitution robot selection unit 46. The substitution robot selection unit 46 selects the substitution robot 10 which substitutes for welding on the welding spot.

In step S11, the substitution robot selection unit 46 searches candidates of the substitution robot 10 from the robots 10 installed in the same working station. In step S12, the substitution robot selection unit 46 determines whether there is a candidate for the substitution robot 10 in the same working station. When there is a candidate for the substitution robot 10 (step S12: YES), the process proceeds to step S13. When there is no candidate for the substitution robot 10 (step S12: NO), the process proceeds to step S16.

Here, a specific process performed by the substitution robot selection unit 46 in steps S11 and S12 will be described with reference to FIG. 1. It is assumed that the robot 10A1 of the working station A cannot be welded to a certain welding spot. The substitution robot selection unit 46 determines whether the welding spot is included in the movable ranges FA2 to FA6 other than the movable range FA1. For example, when the welding spot is included in the movable range FA2, the substitution robot selection unit 46 selects the robot 10A2 as a candidate for the substitution robot 10.

In step S13, the substitution robot selection unit 46 compares the cross section 22C of the welding gun 22 included in the candidate for the substitution robot 10 with the cross section WC of the workpiece W in the welding spot. Specifically, the process equivalent to the process performed by the welding capability determination unit 44 in step S3 shown in FIG. 5 is performed.

In step S14, the substitution robot selection unit 46 determines whether it is possible to weld the welding spot with the welding gun 22 of the robot 10. Specifically, the process equivalent to the process performed by the welding capability determination unit 44 is performed in step S4 shown in FIG. 5. When the cross section 22C of the welding gun 22 and the cross section WC of the workpiece W do not come into contact with each other, the substitution robot selection unit 46 determines that welding is possible (step S14: YES). At this time, the process proceeds to step S15. On the other hand, when the cross section 22C of the welding gun 22 and the cross section WC of the workpiece W are to contact each other, the substitution robot selection section 46 determines that welding is impossible (step S14: NO). At this time, the process returns to step S11, and a search process of a further substitution robot 10 is performed.

In step S15, the substitution robot selection unit 46 selects the candidate for the substitution robot 10 as the substitution robot 10, and ends the substitution robot selection process.

In step S16, a candidate for the substitution robot 10 is retrieved from among the robots 10 installed in another working station. In step S17, the substitution robot selection unit 46 determines whether there is a candidate for the substitution robot 10 in the other working station. When there is a candidate for the substitution robot 10 (step S17: YES), the process proceeds to step S13. When there is no candidate for the substitution robot 10 (step S17: NO), the substitution robot selection process is ended.

Here, a specific process performed by the substitution robot selection unit 46 in steps S16 and S17 will be described with reference to FIG. 1 and FIG. 4. It is assumed that the robot 10A1 of the working station A cannot be welded to a certain welding spot. The substitution robot selection unit 46 refers to the welding spot-process table 62 (see FIG. 4) stored in the table storage unit 48, and selects an operation process other than the operation process associated with the spot number, for example, the operation process A associated with the spot number 1001. In the welding spot-process table 62 in FIG. 4, the spot number 1001 is associated with the operation process B in addition to the operation process A. In this case, the substitution robot selection unit 46 selects the operation process B. The substitution robot selection unit 46 then determines whether or not the welding spot is included in the movable ranges FB1 to FB6 of the robots 10B1 to 10B6 installed in the working station B. For example, when the welding spot is included in the movable range FB1, the substitution robot selection unit 46 selects the robot 10B1 as a candidate for the substitution robot 10. Thereafter, the process proceeds to step S13, and the process is continued.

[Summary of Present Embodiment]

Broadly speaking, a robot selection process, a welding capability determination process, and a substitution robot selection process are performed in the present embodiment.

The robot selection process is performed by the robot selection unit 42 of the robot selection apparatus 40. The robot selection unit 42 selects a robot 10 that performs a welding operation with respect to an arbitrary welding spot (step S2).

The welding capability determination step is performed by the welding capability determination part 44 of the robot selection apparatus 40. The welding capability determination unit 44 compares the cross section 22C of the welding gun 22 of the robot 10 selected in the robot selection step with the cross section WC of the workpiece W at the welding spot (step S3). Then, it is determined whether the welding spot can be welded without contact between the welding gun 22 of the robot 10 and the workpiece W (step S4).

The substitution robot selection process is performed by the substitution robot selection unit 46 of the robot selection apparatus 40. The substitution robot selection unit 46 selects the substitution robot 10 for substituting for the welding of the welding spot when it is determined that it is not possible to weld the welding spot without any contact between the welding gun 22 and the workpiece W in the welding capability determination step (step S5). Specifically, the substitution robot selection unit 46 selects the candidate for the substitution robot 10 (step S12: YES, step S17: YES), and compares the cross section 22C of the welding gun 22 included in the candidate for the substitution robot 10 with the cross section WC of the workpiece W (step S13). When it is possible to weld the welding spot without any contact between the welding gun 22 included in the candidate for the substitution robot 10 and the workpiece W, the candidate for the substitution robot 10 is set as the substitution robot 10.

As described above, in the present embodiment, after selecting the robot 10 to perform the welding operation with respect to an arbitrary welding spot, the cross section of the welding gun of the robot 10 is compared with the cross section of the workpiece W at the welding spot. Then, it is determined whether welding can be performed without contact between the welding gun 22 and the workpiece W. If it is determined that it is not possible, the substitution robot 10 that substitutes the welding of the welding spot is selected. According to the present embodiment, by performing such a process, it is possible to select automatically the robot 10 that performs the welding operation on the welding spot. As a result, it is possible to reduce worker-hours for robot selection.

The invention claimed is:

1. A robot selection method for selecting a robot for each of a plurality of welding spots distributed in a workpiece to perform a welding operation with respect to the welding spots, the method comprising the steps of:
   a data acquiring step of acquiring welding spot data, robot data and existing data, the welding spot data including data of a cross-sectional shape of the workpiece at each welding spot and data of a position of each welding spot, the robot data including data of a cross-sectional shape of a welding gun of the robot, the existing data being formed by associating welding spot data of an existing workpiece with the robot,
   a robot selection step of selecting the robot which has been associated in forming the existing data in a case where the data of an arbitrary position of the welding spot acquired in the data acquiring step falls in a predetermined range in the welding spot data of the existing workpiece;
   a welding capability determination step of determining whether it is possible to weld the welding spot without contact between the welding gun of the robot and the workpiece by determining a cross section of the welding gun of the robot selected in the robot selection step based on the robot data, determining a cross section of the workpiece at the welding spot based on the welding spot data, and comparing the cross section of the welding gun with the cross section of the workpiece; and a substitution robot selecting step of selecting a substitution robot for substituting for welding at the welding spot in a case where the robot selected is determined to be incapable in the welding capability determination step.

2. The robot selection method according to claim 1, wherein in the substitution robot selection step, a candidate for the substitution robot is selected and a cross section of a welding gun of the candidate for the substitution robot is compared with the cross section of the workpiece at the welding spot, and the candidate for the substitution robot is selected as the substitution robot in a case where the welding spot can be welded using the welding gun of the candidate for the substitution robot without contact between the welding gun and the workpiece.

3. The robot selection method according to claim 1, wherein in the substitution robot selecting step, the substitution robot is selected from a working station where the robot is installed.

4. The robot selection method according to claim 1, wherein, in the substitution robot selection step, the substitution robot is selected from a working station other than a working station where the robot is installed.

5. A robot selection apparatus for selecting a robot for each of a plurality of welding spots distributed in a workpiece to perform a welding operation with respect to the welding spots, the robot selection apparatus comprising:

a memory storage unit for storing welding spot data including data of a cross-sectional shape of the workpiece and welding spot position at each welding spot, robot data including data of a cross-sectional shape of a welding gun of the robot, and existing data formed by associating welding spot data of an existing workpiece with the robot, a robot selecting unit configured to select a robot which has been associated in forming the existing data in a case where the data of an arbitrary position of the welding spot included in the welding spot data falls in a predetermined range in the welding spot data of the existing workpiece, a welding capability determining unit configured to determine whether it is possible to weld the welding spot without contact between the welding gun of the robot selected in the robot selecting unit and the workpiece by determining a cross section of the welding gun of the robot based on the robot data, determining a cross section of the workpiece at the welding spot based on the welding spot data, and comparing the cross section of the welding gun with the cross section of the workpiece; and a substitution robot selecting unit configured to select a substitution robot for substituting for welding at the welding spot in a case where the robot selected is determined to be incapable by the welding capability determining unit.

6. The robot selection apparatus according to claim 5, wherein a substitution robot selection unit is configured to select a candidate for the substitution robot, compare a cross section of a welding gun of the candidate for the substitution robot with a cross section of the workpiece at the welding spot, and select the candidate as the substitution robot in a case where the welding spot can be welded using the welding gun of the substitution robot without contact between the welding gun and the workpiece.

* * * * *